ized Patent (12) United States Patent
Kaneko (10) Patent No.: US 9,910,628 B2
(45) Date of Patent: Mar. 6, 2018

(54) ELECTRONIC DEVICE, SESSION CONTINUITY DETERMINING METHOD, AND DATA TRANSMISSION/RECEPTION SYSTEM

(71) Applicant: KYOCERA Document Solutions Inc., Osaka-shi, Osaka (JP)

(72) Inventor: Kotaro Kaneko, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/360,339

(22) Filed: Nov. 23, 2016

(65) Prior Publication Data

US 2017/0153856 A1    Jun. 1, 2017

(30) Foreign Application Priority Data

Nov. 27, 2015   (JP) ................. 2015-231770

(51) Int. Cl.
G06F 3/12        (2006.01)
H04N 1/00        (2006.01)
G06K 15/00       (2006.01)

(52) U.S. Cl.
CPC .......... G06F 3/1236 (2013.01); G06F 3/1209 (2013.01); H04N 1/00323 (2013.01); H04N 1/00973 (2013.01); H04N 2201/0094 (2013.01)

(58) Field of Classification Search
CPC . G06F 3/1236; G06F 3/1209; H04N 1/00323; H04N 1/00973; H04N 2201/0094; H04L 47/10; H04L 47/24; H04L 47/781; H04L 47/27; H04L 67/28; H04L 67/2847; H04L 67/2852

USPC .................................................. 358/1.1–1.18
See application file for complete search history.

(56) References Cited

U.S. PATENT DOCUMENTS

| 2007/0297352 | A1* | 12/2007 | Jabri ................ H04L 29/06027 370/261 |
| 2008/0107221 | A1* | 5/2008 | Yamanaka ............ H04L 1/0001 375/371 |
| 2008/0229023 | A1* | 9/2008 | Plamondon ......... G06F 12/0862 711/126 |

(Continued)

FOREIGN PATENT DOCUMENTS

JP        2008040680 A     2/2008

*Primary Examiner* — Gabriel Garcia
(74) *Attorney, Agent, or Firm* — Alleman Hall Creasman & Tuttle LLP (57) ABSTRACT

An electronic device includes a central processing unit (CPU) and a storage device. By executing a session continuity determination program, the CPU functions as: an Ack reception determining portion that determines whether an Ack, as a response to dummy data transmitted to a transmission side electronic device, has been received from the transmission side electronic device; a data reception determining portion that determines, when the Ack reception determining portion determines that the Ack has not been received, whether a particular data has been received from the transmission side electronic device within a particular time; and a non-continuity case processing portion that performs, when the data reception determining portion determines that the particular data has not been received within the particular time, a process for a case where a session with the transmission side electronic device is not being continued.

6 Claims, 12 Drawing Sheets

(56) References Cited

U.S. PATENT DOCUMENTS

| | | | |
|---|---|---|---|
| 2011/0235108 A1* | 9/2011 | Kato | G06F 3/1218 358/1.15 |
| 2015/0237554 A1* | 8/2015 | Craig | H04W 36/18 370/332 |

* cited by examiner

ELECTRONIC DEVICE, SESSION CONTINUITY DETERMINING METHOD, AND DATA TRANSMISSION/RECEPTION SYSTEM

INCORPORATION BY REFERENCE

This application is based upon and claims the benefit of priority from the corresponding Japanese Patent Application No. 2015-231770 filed on Nov. 27, 2015, the entire contents of which are incorporated herein by reference.

BACKGROUND

The present disclosure relates to an electronic device which determines whether a session is being continued, a session continuity determining method, and a data transmission/reception system.

A typical monitoring device has been known which acquires, from a receiving device that receives data, an amount of received data at a particular time interval, and determines, when the amount of received data has not changed, that a data transfer session is not being continued.

SUMMARY

An electronic device according to an aspect of the present disclosure is an electronic device that receives particular data from a transmission side electronic device that transmits the particular data, and includes: a central processing unit (CPU); and a storage device including a semiconductor memory or a hard disk drive (HDD). The storage device has stored a session continuity determination program therein. By executing the session continuity determination program, the CPU functions as: an Ack reception determining portion that determines whether an Ack, as a response to dummy data transmitted to the transmission side electronic device, has been received from the transmission side electronic device; a data reception determining portion that determines, when the Ack reception determining portion determines that the Ack has not been received, whether the particular data has been received from the transmission side electronic device within a particular time; and a non-continuity case processing portion that performs, when the data reception determining portion determines that the particular data has not been received within the particular time, a process for a case where a session with the transmission side electronic device is not being continued.

A session continuity determining method according to another aspect of the present disclosure is a session continuity determining method performed by an electronic device that receives particular data from a transmission side electronic device that transmits the particular data. The method includes: determining whether an Ack, as a response to dummy data transmitted to the transmission side electronic device, has been received from the transmission side electronic device; determining, when it is determined that the Ack has not been received, whether the particular data has been received from the transmission side electronic device within a particular time; and performing, when it is determined that the particular data has not been received within the particular time, a process for a case where a session with the transmission side electronic device is not being continued.

A data transmission/reception system according to still another aspect of the present disclosure includes: a transmission side electronic device that transmits particular data; and a reception side electronic device that receives the particular data from the transmission side electronic device. The reception side electronic device includes a central processing unit (CPU), and a storage device including a semiconductor memory or a hard disk drive (HDD). The storage device has stored a session continuity determination program therein. By executing the session continuity determination program, the CPU functions as: an Ack reception determining portion that determines whether an Ack, as a response to dummy data transmitted to the transmission side electronic device, has been received from the transmission side electronic device; a data reception determining portion that determines, when the Ack reception determining portion determines that the Ack has not been received, whether the particular data has been received from the transmission side electronic device within a particular time; and a non-continuity case processing portion that performs, when the data reception determining portion determines that the particular data has not been received within the particular time, a process for a case where a session with the transmission side electronic device is not being continued.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings.

First, the configuration of a data transmission/reception system according to the present embodiment will be described.

Figure 1:
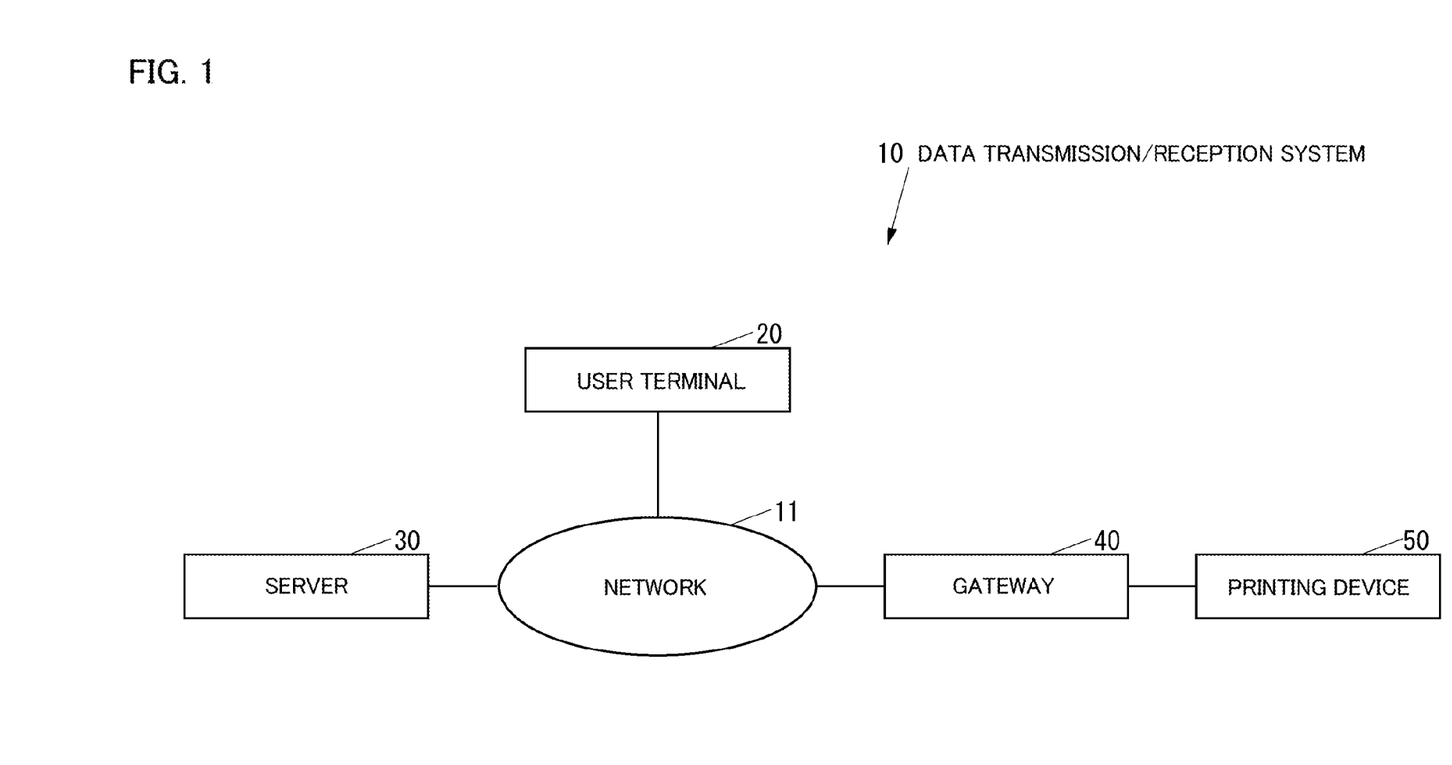
FIG. 1 is a block diagram of a data transmission/reception system according to an embodiment of the present disclosure.

FIG. 1 is a block diagram of a data transmission/reception system 10 according to the present embodiment.

As shown in FIG. 1, the data transmission/reception system 10 includes a user terminal 20 used by a user, a server 30 as a transmission-side electronic device that transmits management data as particular data, a gateway 40 as a reception-side electronic device that receives the management data transmitted from the server 30, and a printing device 50 as a printing device connected to the gateway 40.

The user terminal 20 and the server 30 can communicate with each other via a network 11 such as a LAN (local area network) or the internet.

The server 30 and the gateway 40 can communicate with each other via the network 11.

The gateway 40 and the printing device 50 can communicate with each other via a cable such as a USB (universal serial bus) cable.

The data transmission/reception system 10 may include a plurality of user terminals similar to the user terminal 20. However, as a representative of user terminals provided in the data transmission/reception system 10, the user terminal 20 will be described later.

The data transmission/reception system 10 may include a plurality of computers connected to the printing device similarly to the gateway 40. However, as a representative of computers provided in the data transmission/reception system 10, the gateway 40 will be described later.

The data transmission/reception system 10 may include a plurality of printing devices similar to the printing device 50. However, as a representative of printing devices provided in the data transmission/reception system 10, the printing device 50 will be described later.

The user terminal 20 is configured by a portable terminal such as a smartphone, or a computer such as a PC (personal computer).

The printing device 50 is configured by an MFP (multi-function peripheral) or a dedicated printer, for example.

Figure 2:
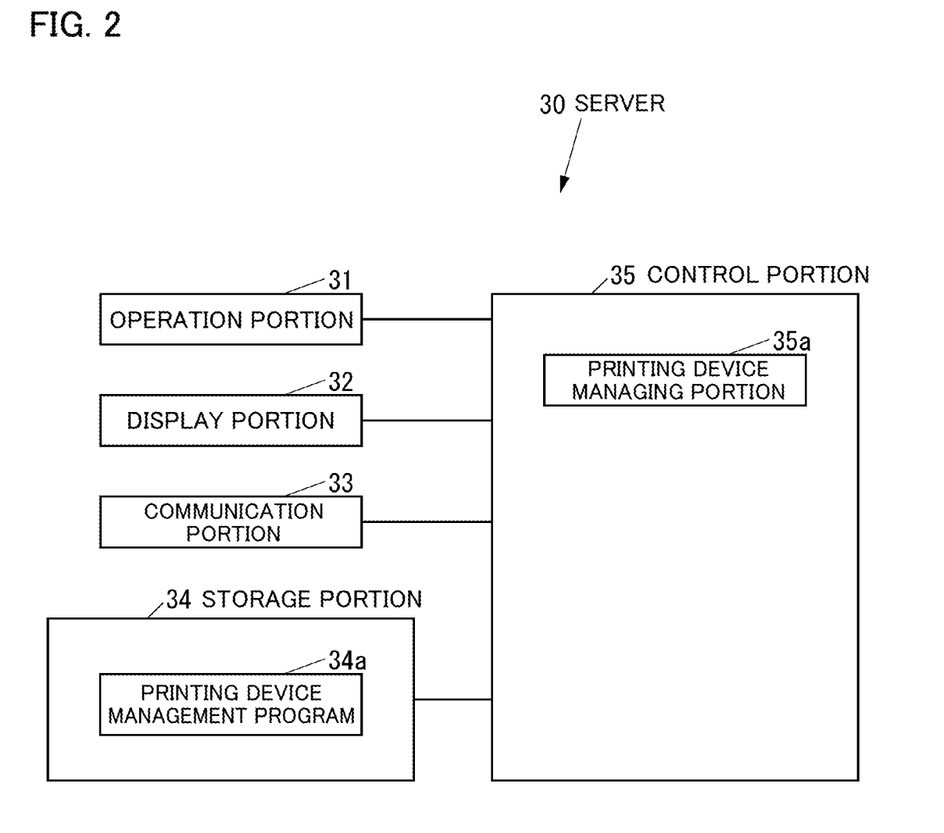
FIG. 2 is a block diagram of a server shown in FIG. 1.

FIG. 2 is a block diagram of the server 30.

As shown in FIG. 2, the server 30 includes: an operation portion 31 which is an input device such as a mouse or a keyboard and to which various operations are inputted by a user; a display portion 32 which is a display device such as an LCD (liquid crystal display) which displays various types of information; a communication portion 33 which is a communication device which communicates with an external device via the network 11 (see FIG. 1); a storage portion 34 which is a storage device, such as a semiconductor memory or an HDD (hard disk drive), which has stored various types of data therein; and a control portion 35 which controls the whole of the server 30. The server 30 is configured by a computer such as a PC.

The storage portion 34 has stored therein a printing device management program 34a for managing the printing device. The printing device management program 34a may be installed in the server 30 during manufacture of the server 30, may be additionally installed in the server 30 from an external storage medium such as a USB memory, or may be additionally installed in the server 30 via the network 11.

For example, the control portion 35 includes a CPU (central processing unit), and a ROM (read only memory) which has stored programs and various types of data therein, a RAM (random access memory) which is used as a working area of the CPU. The CPU executes the program stored in the ROM or the storage portion 34.

The control portion 35 executes the printing device management program 34a stored in the storage portion 34, thereby functioning as a printing device managing portion 35a which manages the printing device.

Since the printing device managing portion 35a is a function realized by software on the server 30, it is highly possible that the printing device managing portion 35a processes communication with software of many electronic devices including the gateway 40 (see FIG. 1), and the load on the printing device managing portion 35a is likely to increase. Accordingly, the printing device managing portion 35a is expected to malfunction frequently due to a failure or the like.

Figure 3:
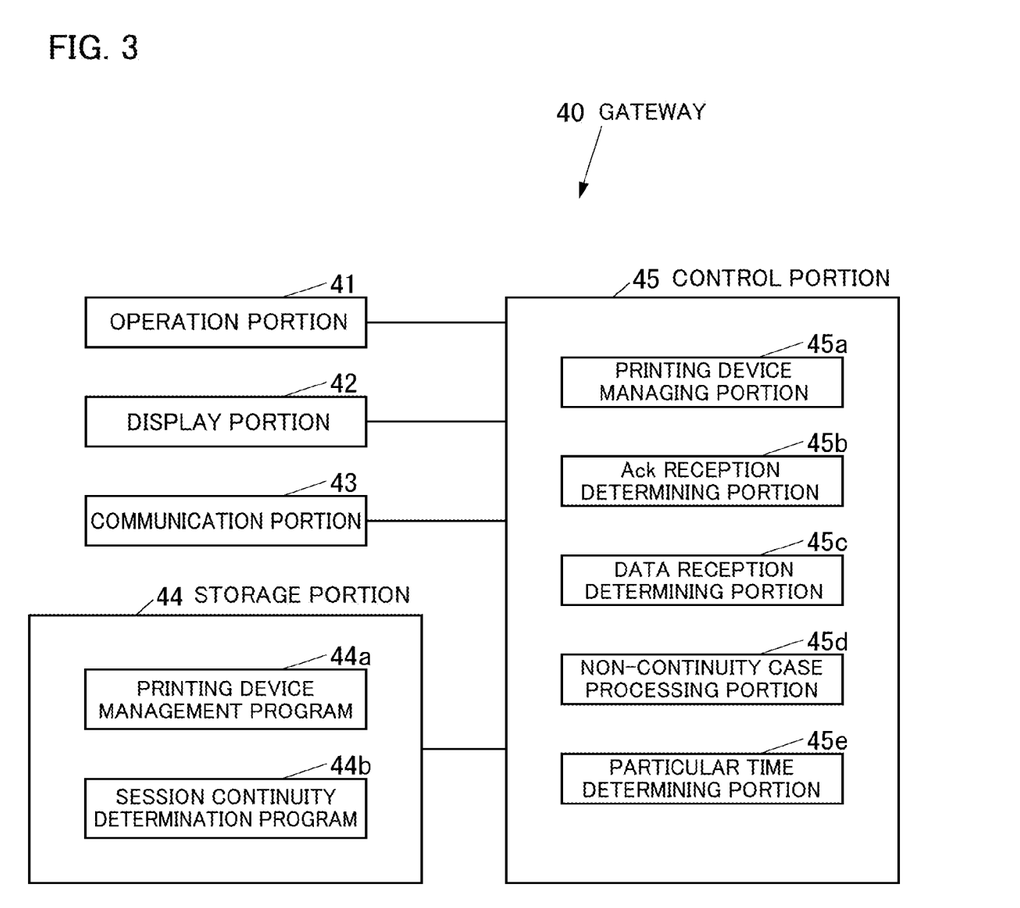
FIG. 3 is a block diagram of a gateway shown in FIG. 1.

FIG. 3 is a block diagram of the gateway 40.

As shown in FIG. 3, the gateway 40 includes: an operation portion 41 which is an input device such as a mouse or a keyboard and to which various operations are inputted by a user; a display portion 42 which is a display device such as an LCD (liquid crystal display) which displays various types of information; a communication portion 43 which is a communication device which communicates with an external device via the network 11 (see FIG. 1); a storage portion 44 which is a storage device, such as a semiconductor memory or an HDD, which has stored various types of data therein; and a control portion 45 which controls the whole of the gateway 40. The gateway 40 is configured by a computer such as a PC.

The storage portion 44 has stored therein a printing device management program 44a for managing the printing device and a session continuity determination program 44b for determining continuity of a session with the server 30 (see FIG. 1). Each of the printing device management program 44a and the session continuity determination program 44b may be installed in the gateway 40 during manufacture of the gateway 40, may be additionally installed in the gateway 40 from an external storage medium such as a USB memory, or may be additionally installed in the gateway 40 via the network 11. The printing device management program 44a and the session continuity determination program 44b may be integrated into a single program.

For example, the control portion 45 includes a CPU, a ROM which has stored programs and various types of data, and a RAM which is used as a working area of the CPU. The CPU executes the program stored in the ROM or the storage portion 44.

The control portion 45 executes the printing device management program 44a stored in the storage portion 44, thereby functioning as a printing device managing portion 45a which manages the printing device.

The control portion 45 executes the session continuity determination program 44b stored in the storage portion 44, thereby functioning as: an Ack reception determining portion 45b which determines whether an Ack (ACKnowledgement) as a response to dummy data transmitted to the server 30 has been received from the server 30; a data reception determining portion 45c which determines whether management data has been received from the server 30 within a particular time; a non-continuity case processing portion 45d which performs a process (hereinafter, "non-continuity case process") for a case where a session with the server 30 is not being continued; and a particular time determining portion 45e which determines the particular time on the basis of a time interval at which the management data has been received from the server 30. The Ack reception determining portion 45b and the data reception determining portion 45c may be implemented by different modules each constituting a part of the session continuity determination program 44b.

Next, operations of the data transmission/reception system 10 will be described.

First, a description will be given of operations of the data transmission/reception system 10 in a case where the management data is transmitted from the server 30 to the gateway 40.

Figure 4:
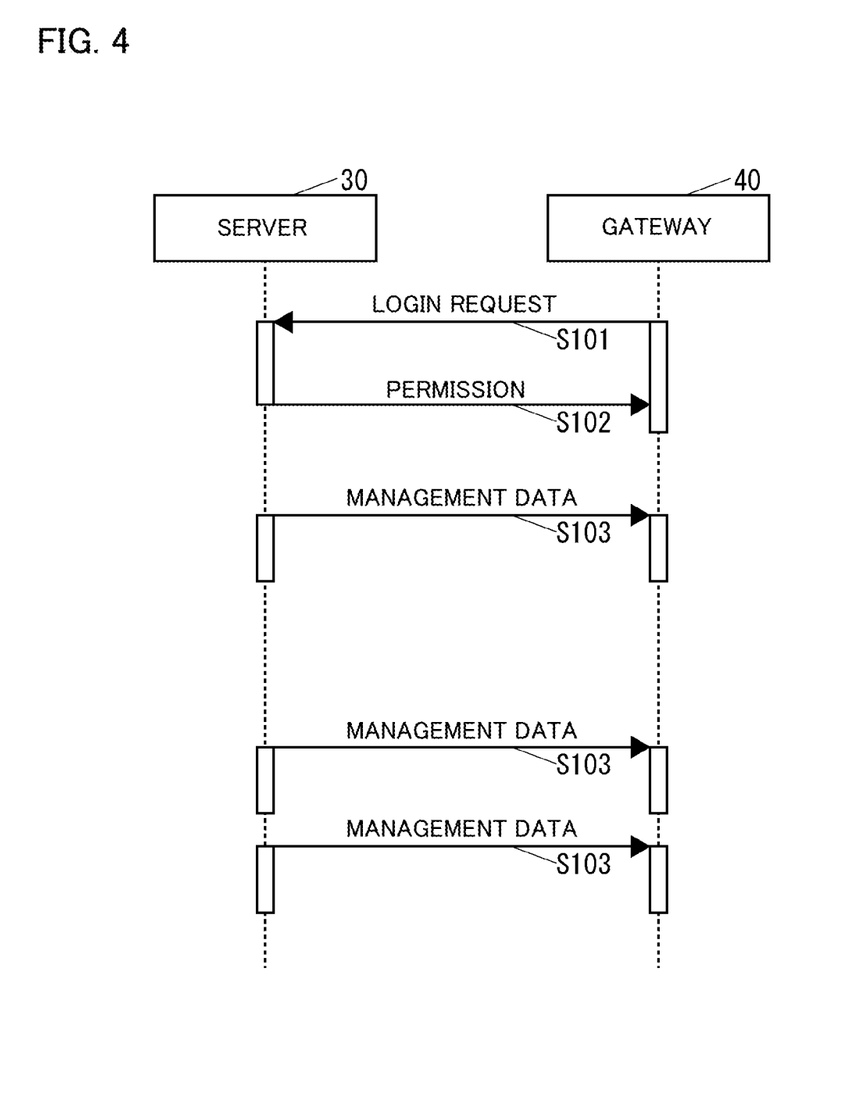
FIG. 4 is a sequence diagram of operations of the data transmission/reception system shown in FIG. 1, in a case where management data is transmitted from the server to the gateway.

FIG. 4 is a sequence diagram of operations of the data transmission/reception system 10 in a case where the management data is transmitted from the server 30 to the gateway 40.

As shown in FIG. 4, the printing device managing portion 45a of the gateway 40 requests login to the server 30 by transmitting, to the server 30, particular authentication information such as a combination of an ID and a password (S101).

Only when the authentication information transmitted from the gateway 40 at S101 is correct, the printing device managing portion 35a of the server 30 permits the login (S102).

The example in which the gateway 40 requests login to the server 30 has been described above. That is, a login request from an intranet side has been described. In currently spread network environments, a login request from the internet side is generally refused by a security component such as firewall. Accordingly, when the network 11 is the internet, the server 30 cannot request login to the gateway 40. That is, in the data transmission/reception system 10, whereas login from the server 30 to the gateway 40 is prohibited by a security component, login from the gateway 40 to the server 30 is permitted by the security component. The security component may be provided to the gateway 40, or may be provided separately from the gateway 40.

After the process of S102, the printing device managing portion 35a of the server 30 can irregularly transmit the management data to the gateway (S103).

A description will be given of operations of the data transmission/reception system 10 in a case where state-acquisition instruction data, as an example of the management data, is transmitted from the server 30 to the gateway 40.

Figure 5:
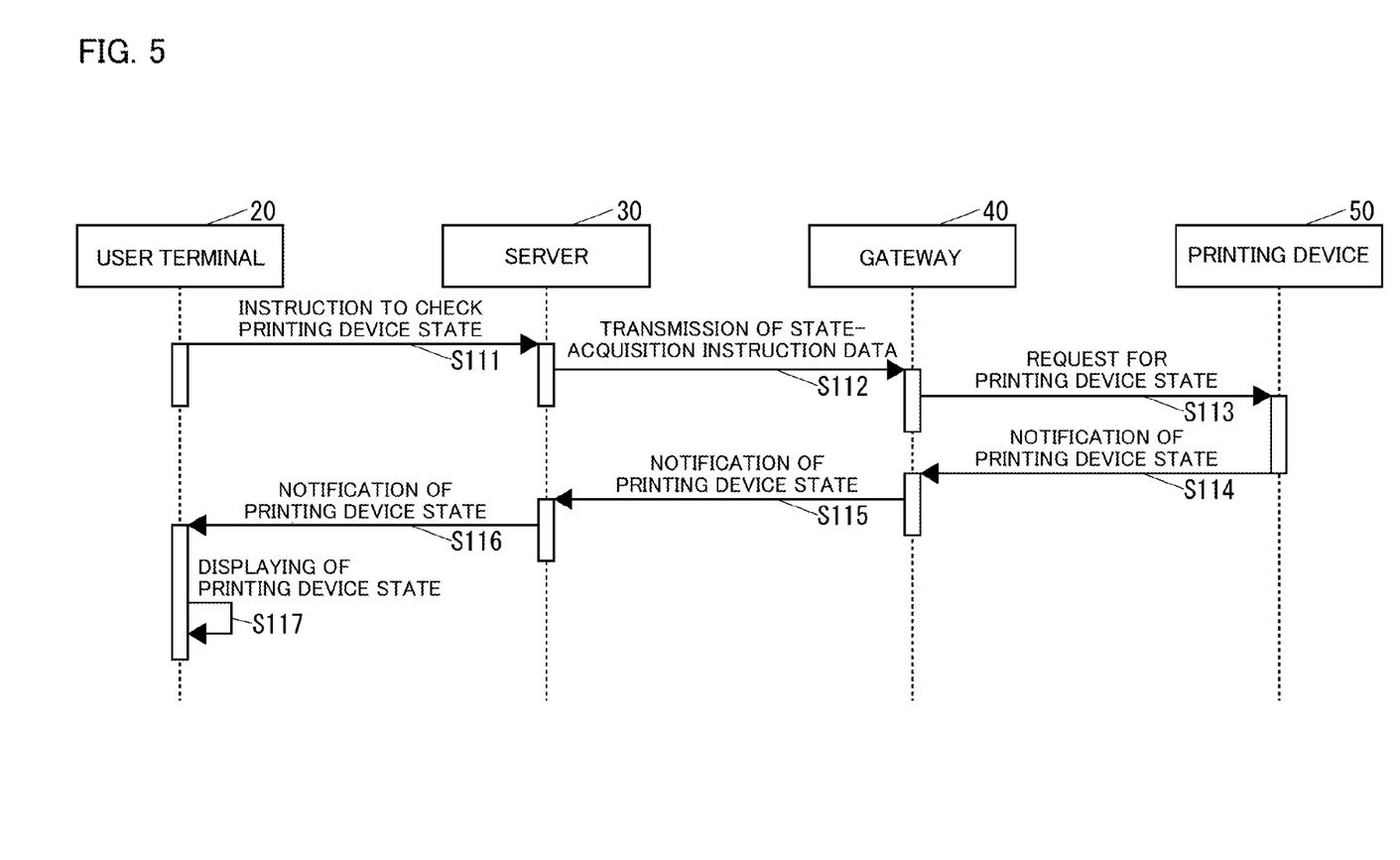
FIG. 5 is a sequence diagram of operations of the data transmission/reception system shown in FIG. 1, in a case where state-acquisition instruction data is transmitted from the server to the gateway.

FIG. 5 is a sequence diagram of operations of the data transmission/reception system 10 in a case where state-acquisition instruction data is transmitted from the server 30 to the gateway 40.

As shown in FIG. 5, the user terminal 20 instructs, in response to an instruction from a user through an operation portion (not shown), the server 30 to check the state of the printing device 50 (S111). The state of the printing device 50 is a state where a recording medium such as paper or a consumable such as toner has run out, or a state where a failure has occurred, for example.

In response to the instruction given at S111, the printing device managing portion 35a of the server 30 transmits, to the gateway 40, state-acquisition instruction data for instructing the gateway 40 to check the state of the printing device 50 (S112).

Next, in response to the state-acquisition instruction data transmitted at S112, the printing device managing portion 45a of the gateway 40 requests the state of the printing device 50 from the printing device 50 (S113).

Next, in response to the request made at S113, the printing device 50 notifies the gateway 40 of the state of the printing device 50 itself (S114).

Next, the printing device managing portion 45a of the gateway 40 notifies the server 30 of the state of the printing device 50 notified at S114 (S115).

Next, the printing device managing portion 35a of the server 30 notifies the user terminal 20 of the state of the printing device 50 notified at S115 (S116).

At last, the user terminal 20 displays, on a display portion (not shown), the state of the printing device 50 notified at S116 (S117).

The operations shown in FIG. 5 are started by the instruction from the user terminal 20 to the server 30. However, the server 30 may transmit the state-acquisition instruction data to the gateway 40 at a particular timing, without depending on an instruction from the user terminal 20.

A description will be given of operations of the data transmission/reception system 10 in a case where firmware, as an example of the management data, is transmitted from the server 30 to the gateway 40.

Figure 6:
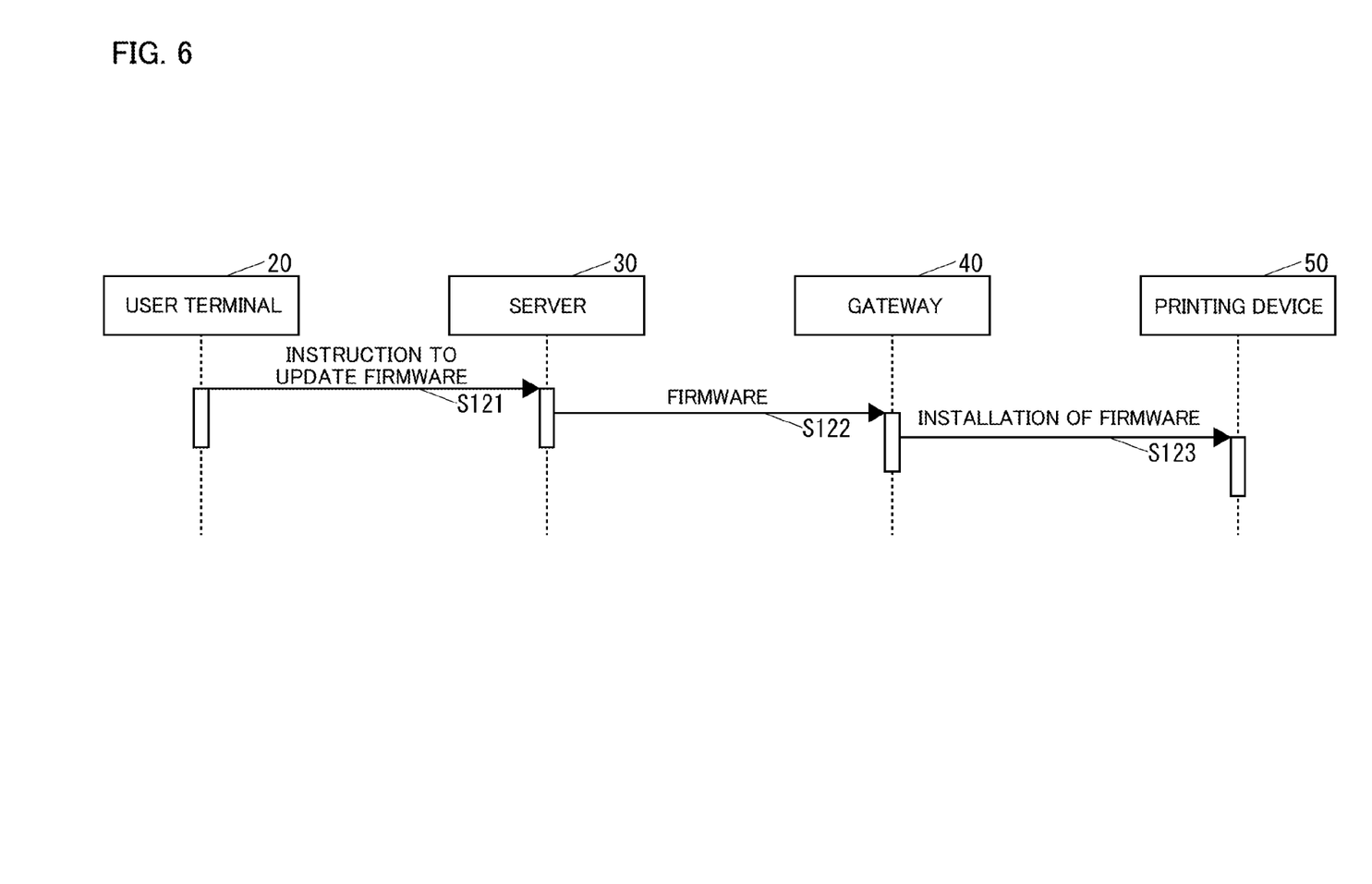
FIG. 6 is a sequence diagram of operations of the data transmission/reception system shown in FIG. 1, in a case where firmware is transmitted from the server to the gateway.

FIG. 6 is a sequence diagram of operations of the data transmission/reception system 10 in a case where firmware is transmitted from the server 30 to the gateway 40.

As shown in FIG. 6, in response to an instruction from a user through the operation portion (not shown), the user terminal 20 instructs the server 30 to update firmware of the printing device 50 (S121).

In response to the instruction made at S121, the printing device managing portion 35a of the server 30 transmits the firmware of the printing device 50 to the gateway 40 (S122).

At last, the printing device managing portion 45a of the gateway 40 installs the firmware transmitted at S122 in the printing device 50 (S123).

The operations shown in FIG. 6 are started by the instruction from the user terminal 20 to the server 30. However, the server 30 may transmit the firmware of the printing device 50 to the gateway 40 at a particular timing, without depending on an instruction from the user terminal 20.

A description will be given of operations of the gateway 40 in a case where it is determined whether a session with the server 30 is being continued.

In a case where data to be received by a receiving device such as the gateway 40 is irregularly transmitted to the receiving device, when such data is received by the receiving device at a time interval longer than a particular time interval, there is a possibility that it is determined that the data transfer session is not being continued. However, the gateway 40 improves accuracy in determining whether a session is being continued in a case where data is irregularly transmitted.

Figure 7:
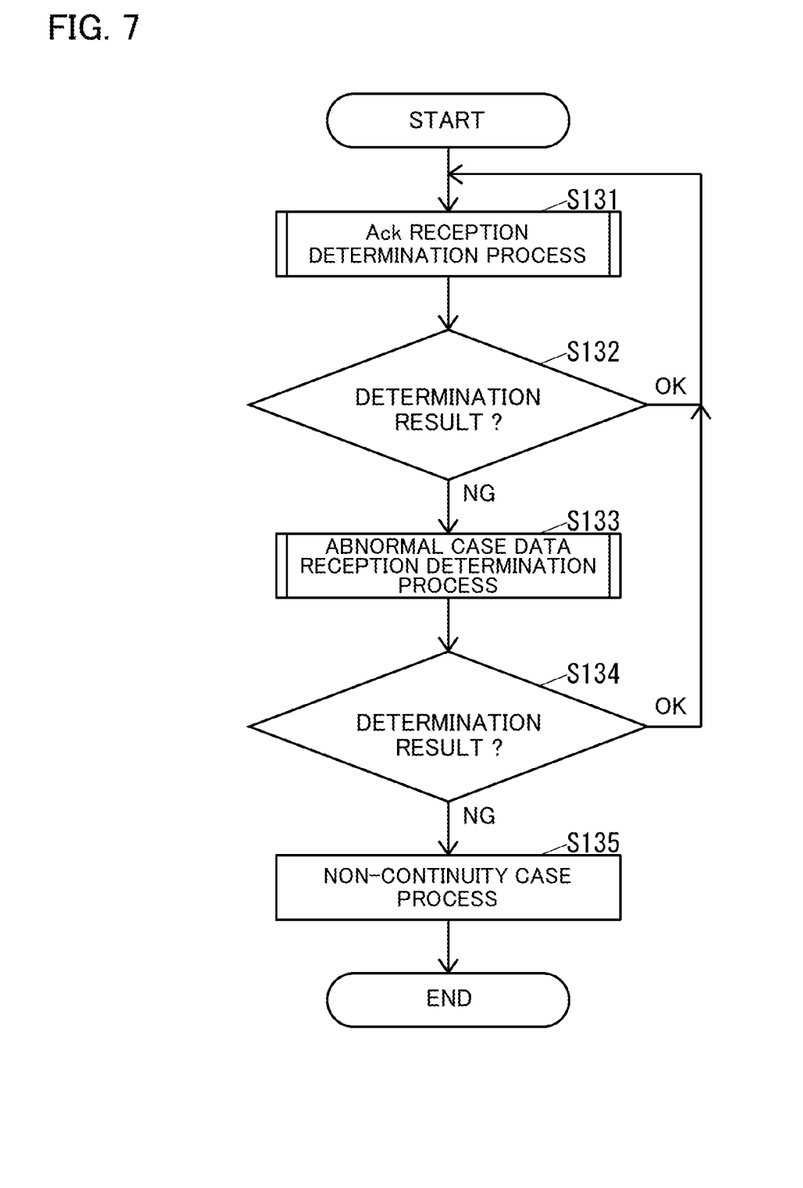
FIG. 7 is a flowchart of operations of the gateway shown in FIG. 3, in a case where continuity of a session with the server is determined.

When the login is permitted at S102, that is, when a session with the server 30 is started, the control portion 45 of the gateway 40 performs operations shown in FIG. 7.

FIG. 7 is a flowchart of operations of the gateway 40 in a case where it is determined whether a session with the server 30 is being continued.

As shown in FIG. 7, the Ack reception determining portion 45b of the gateway 40 performs an Ack reception determination process for determining whether an Ack, as a response to dummy data transmitted to the server 30, has been received from the server 30 (S131: an example of an Ack reception determining step).

Figure 8:
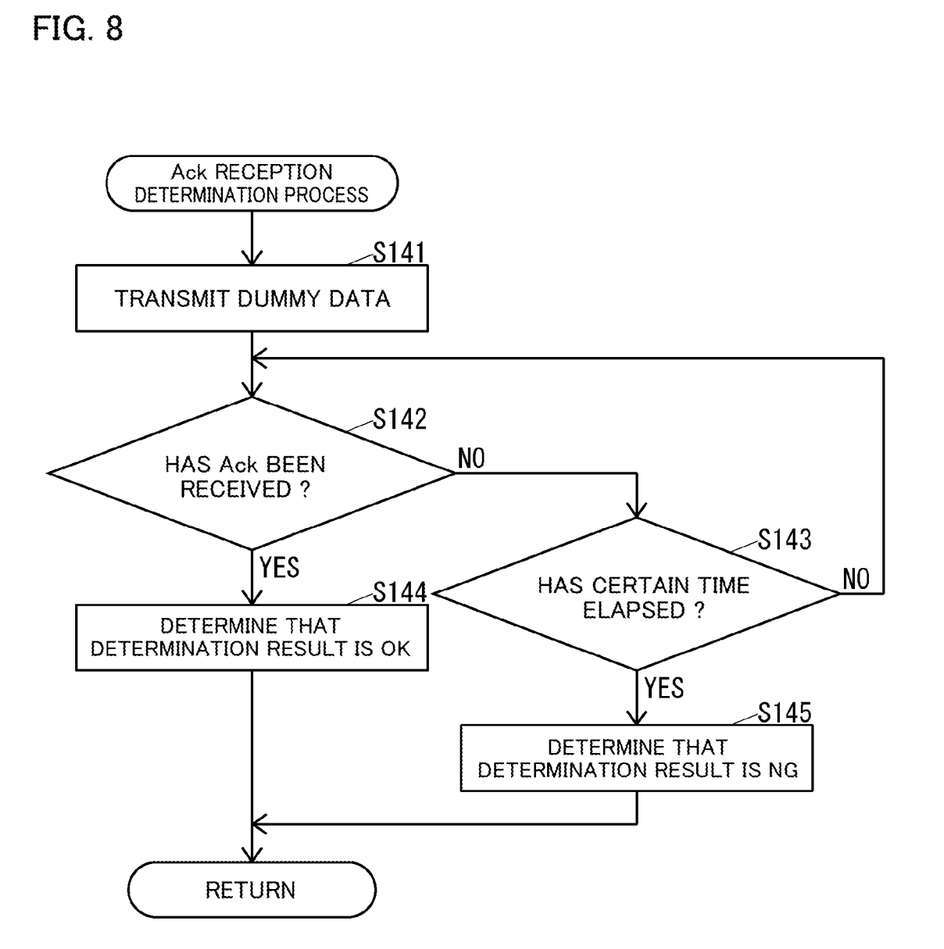
FIG. 8 is a flowchart of an Ack reception determination process shown in FIG. 7.

FIG. 8 is a flowchart of the Ack reception determination process of S131.

As shown in FIG. 8, the Ack reception determining portion 45b transmits the dummy data to the server 30 (S141).

Next, after the process of S141, the Ack reception determining portion 45b determines whether an Ack, as a response to the dummy data transmitted at S141, has been received from the server 30 (S142).

When determining, at S142, that the Ack has not been received yet, the Ack reception determining portion 45*b* determines whether a certain time has elapsed since the transmission of the dummy data at S141 (S143).

When determining, at S143, that the certain time has not elapsed, the Ack reception determining portion 45*b* performs the process of S142.

When determining, at S142, that the Ack has been received, the Ack reception determining portion 45*b* determines that the determination result is OK (S144), and ends the Ack reception determination process shown in FIG. 8.

When determining, at S143, that the certain time has elapsed, the Ack reception determining portion 45*b* determines that the determination result is NG (S145), and ends the Ack reception determination process shown in FIG. 8.

In the communication of the processes of S141 and S142, a generally used protocol may be used. For example, when the printing device management program 34*a* of the server 30 is a web-based program, a generally widely used HTTP (hypertext transfer protocol) may be used as the protocol. That is, no special implementation is required for the printing device management program 34*a*. Alternatively, when the printing device management program 34*a* of the server 30 is not a web-based program, implementation for supporting only a particular method for the HTTP, such as GET, may be performed on the printing device management program 34*a*.

As shown in FIG. 7, after ending the Ack reception determination process of S131, the Ack reception determining portion 45*b* determines whether the determination result of the Ack reception determination process of S131 is OK or NG (S132).

When determining, at S132, that the determination result of the Ack reception determination process is OK, the Ack reception determining portion 45*b* performs the process of S131.

When the determination result of the Ack reception determination process is determined, at S132, to be NG, the data reception determining portion 45*c* of the gateway 40 performs an abnormal case data reception determination process for determining whether the management data has been received from the server 30 within a particular time (S133: an example of a data reception determining step).

Figure 9:
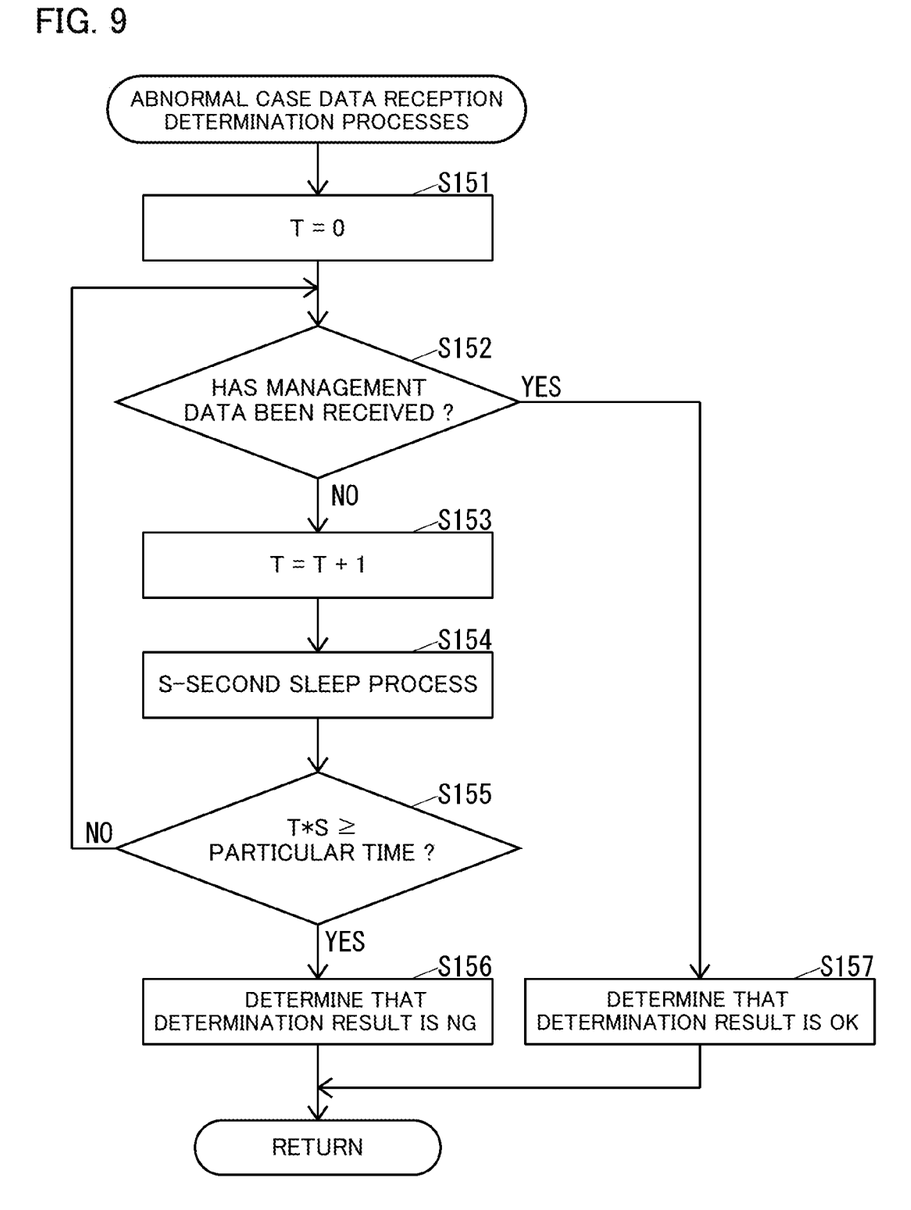
FIG. 9 is a flowchart of an abnormal case data reception determination process shown in FIG. 7.

FIG. 9 is a flowchart of the abnormal case data reception determination process of S133.

As shown in FIG. 9, the data reception determining portion 45*c* substitutes 0 for a variable T (S151).

Next, the data reception determining portion 45*c* determines whether the management data has been received from the server 30 (S152).

When determining, at S152, that the management data has not been received from the server 30, the data reception determining portion 45*c* adds 1 to the variable T (S153), and performs an S-second sleep process (S154).

Next, the data reception determining portion 45*c* determines whether a variable T*S is equal to or greater than the particular time (S155).

When determining, at S155, that the variable T*S is less than the particular time, the data reception determining portion 45*c* performs the process of S152.

When determining, at S155, that the variable T*S is equal to or greater than the particular time, the data reception determining portion 45*c* determines that the determination result is NG (S156), and ends the abnormal case data reception determination process shown in FIG. 9.

When determining, at S152, that the management data has been received from the server 30, the data reception determining portion 45*c* determines that the determination result is OK (S157), and ends the abnormal case data reception determination process shown in FIG. 9.

As shown in FIG. 7, after ending the abnormal case data reception determination process of S133, the data reception determining portion 45*c* determines whether the determination result of the abnormal case data reception determination process of S133 is OK or NG (S134).

When the determination result of the abnormal case data reception determination process is determined, at S134, to be OK, the Ack reception determining portion 45*b* performs the process of S131.

When the determination result of the abnormal case data reception determination process is determined, at S134, to be NG, the non-continuity case processing portion 45*d* of the gateway 40 performs a non-continuity case process (S135: an example of a non-continuity processing step), and ends the operations shown in FIG. 7.

Examples of the non-continuity case process include a process for stopping operation of the Ack reception determining portion 45*b*, and a process for stopping operation of the data reception determining portion 45*c*. When the determination result of the abnormal case data reception determination process is NG, the session between the server 30 and the gateway 40 is considered to have been ended, that is, the gateway 40 is considered to have logged out of the server 30. Accordingly, until the gateway 40 logs in again to the server 30 to restart a session between the server 30 and the gateway 40, the Ack reception determining portion 45*b* and the data reception determining portion 45*c* can be inhibited from consuming the resource of the gateway 40.

Examples of the non-continuity case process further include a process for causing the data reception determining portion 45*c* of the gateway 40 to log in again to the server 30 after elapse of a certain time.

Figure 10:
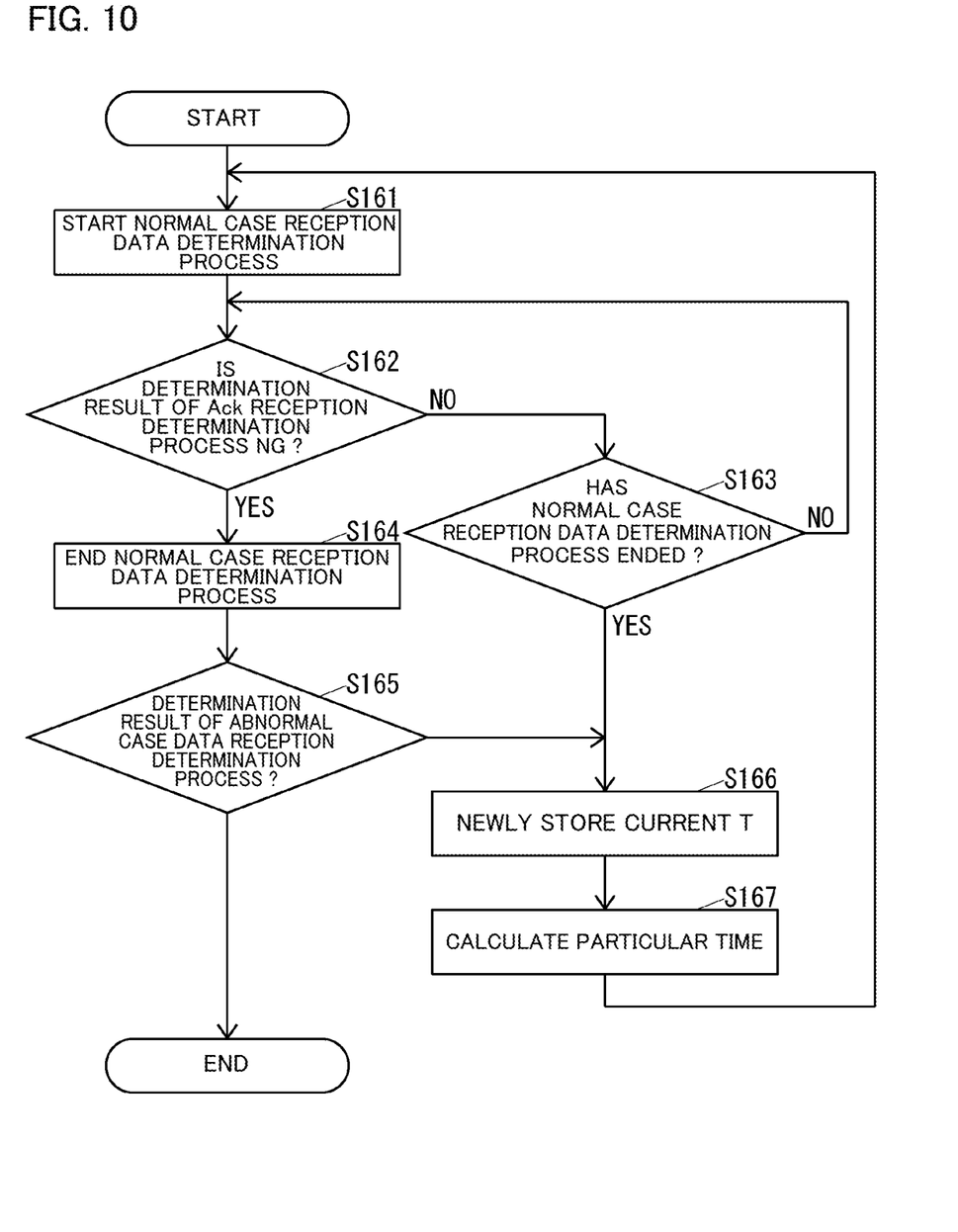
FIG. 10 is a flowchart of operations of the gateway shown in FIG. 3, in a case where a particular time is determined.

When the login is permitted at S102, that is, when a session with the server 30 is started, the particular time determining portion 45*e* of the gateway 40 performs operations shown in FIG. 10 in order to determine the particular time used at S155.

FIG. 10 is a flowchart of operations of the gateway 40 in a case of determining the particular time.

Figure 11:
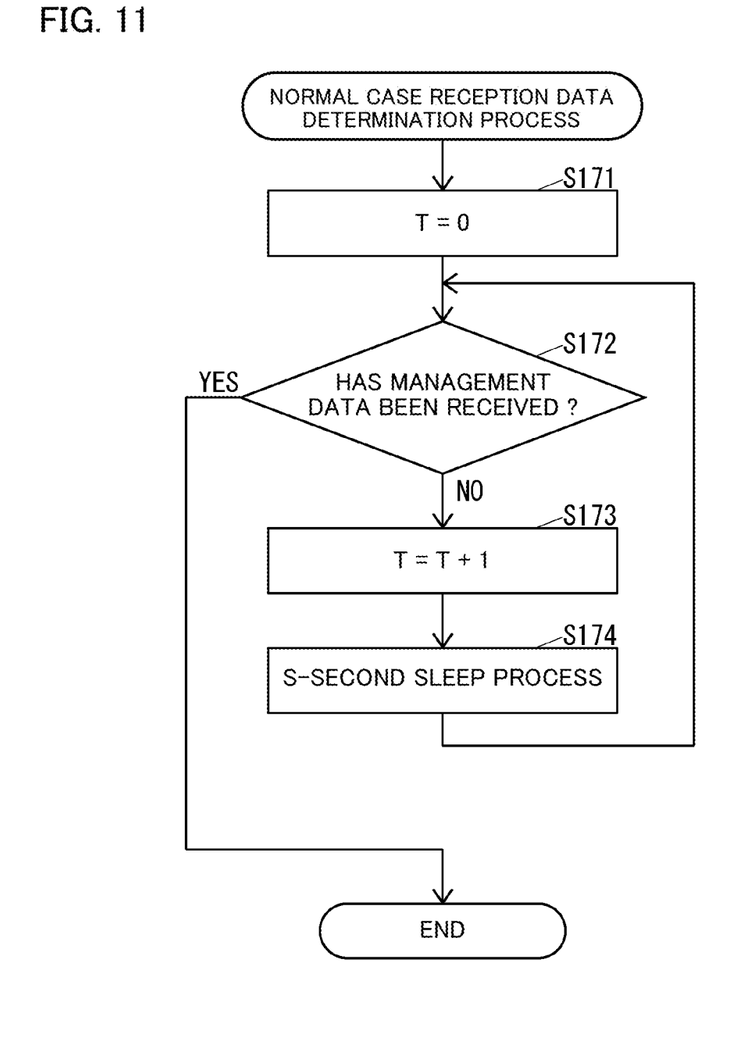
FIG. 11 is a flowchart of a normal case reception data determination process shown in FIG. 10.

As shown in FIG. 10, the particular time determining portion 45*e* starts a normal case reception data determination process shown in FIG. 11 (S161).

FIG. 11 is a flowchart of the normal case reception data determination process shown in FIG. 10.

As shown in FIG. 11, the data reception determining portion 45*c* substitutes 0 for the variable T (S171).

Next, the data reception determining portion 45*c* determines whether the management data has been received from the server 30 (S172).

When determining, at S172, that the management data has not been received from the server 30, the data reception determining portion 45*c* adds 1 to the variable T (S173), performs an S-second sleep process (S174), and then, performs the process of S172.

When determining, at S172, that the management data has been received from the server 30, the data reception determining portion 45*c* ends the normal case data reception determination process shown in FIG. 11.

As shown in FIG. 10, after the process of S161, the particular time determining portion 45*e* determines whether the determination result of the Ack reception determination process of S131 is NG (S162).

When determining, at S162, that the determination result of the Ack reception determination process is not NG, the particular time determining portion 45e determines whether the normal case reception data determination process started at S161 has been ended (S163).

When determining, at S163, that the normal case reception data determination process has not been ended, the particular time determining portion 45e performs the process of S162.

When determining, at S162, that the determination result of the Ack reception determination process is NG, the particular time determining portion 45e forcibly ends the normal case reception data determination process started at S161 (S164), and determines whether the determination result of the abnormal case data reception determination process of S133 is OK or NG (S165).

When determining, at S163, that the normal case reception data determination process has been ended, or determining, at S165, that the determination result of the abnormal case data reception determination process is OK, the particular time determining portion 45e newly stores the current T in the storage portion 44 (S166), and calculates the particular time on the basis of a plurality of Ts stored in the storage portion 44 (S167).

That is, the particular time determining portion 45e calculates, as T*S, a time interval at which the management data has been received from the server 30, for each of the plurality of Ts stored in the storage portion 44. The calculated time intervals are past time intervals. The particular time determining portion 45e adds a particular margin to the average value of a predetermined number of the calculated past time intervals, thereby calculating the particular time.

After the process of S167, the particular time determining portion 45e performs the process of S161.

When determining, at S165, that the determination result of the abnormal case data reception determination process is NG, the particular time determining portion 45e ends the operations shown in FIG. 10.

Figure 12:
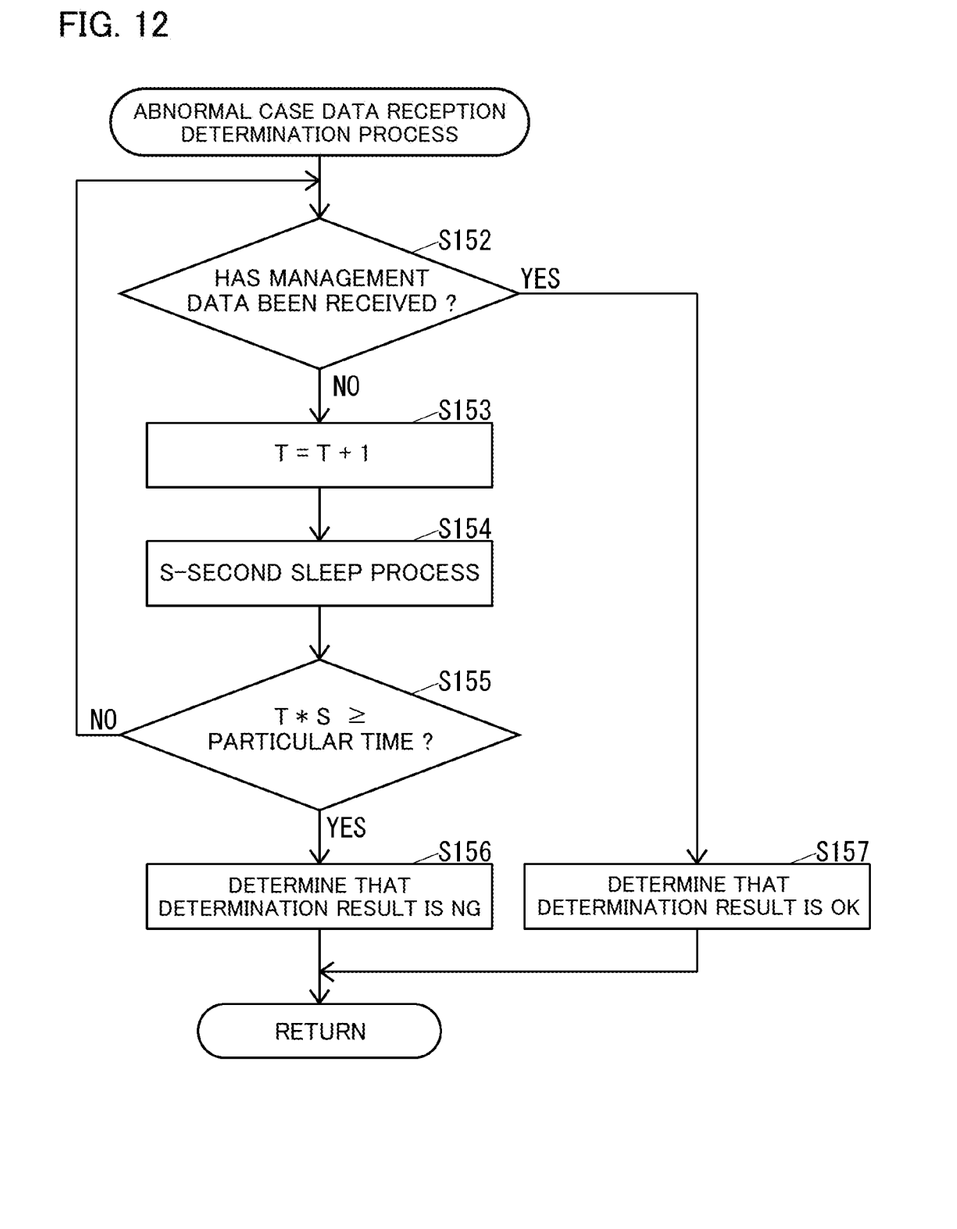
FIG. 12 is a flowchart of the abnormal case data reception determination process shown in FIG. 7, as an example different from the example in FIG. 9.

In the abnormal case data reception determination process shown in FIG. 9, 0 is substituted for the variable T at S151. However, as shown in FIG. 12, the process of S151 may be omitted. In the abnormal case data reception determination process shown in FIG. 12, the value of the variable T used in the normal case reception data determination process which has been forcibly ended at S164 can be used as it is.

In the above, the particular time is calculated. However, the particular time may be a fixed value. When the particular time is a fixed value, the gateway 40 does not need to perform the operations shown in FIG. 10.

As described above, when the gateway 40 receives, from the server 30, the Ack as a response to the dummy data transmitted to the server 30 (YES at S142), the gateway 40 determines that the session with the server 30 is being continued, regardless of whether the management data has been received from the server 30 within the particular time. Accordingly, accuracy in determination of session continuity in a case where the server 30 irregularly transmits the management data can be improved.

In the communication of the processes of S141 and S142, the gateway 40 uses, as a protocol, a widely used protocol such as a HTTP. For such a protocol, permissions to pass through a security component such as firewall of a network environment in a company or a house are set in most cases. Thus, the gateway 40 can be used in a currently used environment such as the internet, without requiring a security level change such as a firewall setting change.

In the Ack reception determination process, only whether the communication path between the server 30 and the gateway 40 has a problem is determined, and no new authentication is required. Therefore, in the Ack reception determination process, almost no load is applied on the server 30 and the gateway 40. In addition, since new authentication is not required, a login or logout state can be precisely recognized by the non-continuity processing portion 45d without an unnecessary process for login or logout.

The gateway 40 determines the particular time, as a threshold for determination as to session continuity, on the basis of an actual time interval at which the management data has been received from the server 30 (S167). Therefore, accuracy in determining whether a session is being continued can be improved.

The gateway 40 can improve accuracy in determining whether a session is being continued in a case where the server 30 irregularly transmits the management data. Accordingly, even when login from the server 30 is prohibited, the gateway 40 can appropriately receive the management data from the server 30 by appropriately continuing the session.

The "transmission side electronic device" of the present disclosure is the server in the present embodiment. However, the transmission side electronic device may be an image forming device such as a dedicated printer, a dedicated facsimile machine, or a dedicated copy machine, or may be an electronic device other than an image forming device. When the "transmission side electronic device" is an image forming device, examples of the particular data transmitted from the image forming device include data indicating that the state of the image forming device has changed.

The "reception side electronic device" of the present disclosure is the gateway in the present embodiment. However, the reception side electronic device may be an image forming device such as a dedicated printer, a dedicated facsimile machine, or a dedicated copy machine, or may be an electronic device other than an image forming device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A gateway that is connected to a printing device and receives management data from a server that transmits the management data, the gateway comprising:
   a central processing unit (CPU); and
   a storage device including a semiconductor memory or a hard disk drive (HDD), wherein
   the storage device stores a printing device management program for managing the printing device, and a session continuity determination program for determining continuity of a session with the server,
   the gateway executes the printing device management program via the CPU to be configured for requesting a login by transmitting authentication information to the server;
   the server, when permitting the login based on the authentication information, is configured for irregularly transmitting the management data to the gateway,
   the management data includes at least one of state-acquisition instruction data for acquiring a state of the printing device, and firmware for updating firmware of the printing device,
   the gateway executes the session continuity determination program via the CPU to be configured for determining whether an Ack, as a response to dummy data transmitted to the server, has been received from the server, an abnormal case data reception determination process is performed via the CPU for determining, when determining that the Ack has not been received, whether the management data has been received from the server within a particular time, wherein the abnormal case data reception determination process includes:
- when determining that the management data has not been received, adding 1 to a variable T and performing an S-second sleep process, and
- when determining whether a variable T*S is equal to or greater than the particular time, determining whether the management data has not been received within the particular time, when determining that the management data has not been received within the particular time, a non-continuity case process for a case where the session with the server is not being continued is performed via the CPU, wherein the non-continuity case process includes:
- stopping a first operation via the gateway of determining whether the Ack has been received from the server, and
- stopping a second operation via the gateway of determining whether the management data has been received from the server.

2. The gateway according to claim 1, wherein the gateway executes the session continuity determination program via the CPU to be further configured for determining the particular time calculated by adding a particular margin to an average value of a predetermined number of past time intervals as variables T*S received from the server.

3. The gateway according to claim 1, wherein
login from the server is prohibited, and
login to the server is permitted.

4. A data transmission/reception system comprising:
a server that transmits management data;
a gateway that receives the management data from the server, the gateway including a central processing unit (CPU) and a storage device including a semiconductor memory or a hard disk drive (HDD); and
a printing device connected to the gateway, wherein
the storage device stores a printing device management program for managing the printing device and a session continuity determination program for determining continuity of a session with the server,
the gateway executes the printing device management program via the CPU to be configured for requesting a login by transmitting authentication information to the server;
the server, when permitting the login based on the authentication information, is configured for irregularly transmitting the management data to the gateway,
the management data includes at least one of state-acquisition instruction data for acquiring a state of the printing device and firmware for updating firmware of the printing device,
the gateway executes the session continuity determination program via the CPU to be configured for
determining whether an Ack, as a response to dummy data transmitted to the server, has been received from the server,
an abnormal case data reception determination process is performed via the CPU for determining, when determining that the Ack has not been received, whether the management data has been received from the server within a particular time, wherein
the abnormal case data reception determination process includes:
- when determining that the management data has not been received, adding 1 to a variable T and performing an S-second sleep process, and
- when determining whether a variable T*S is equal to or greater than the particular time, determining whether the management data has not been received within the particular time, when determining that the management data has not been received within the particular time, a non-continuity case process for a case where the session with the server is not being continued is performed via the CPU, wherein the non-continuity case process includes:
- stopping a first operation via the gateway of determining whether the Ack has been received from the server, and
- stopping a second operation via the gateway of determining whether the management data has been received from the server.

5. The data transmission/reception system according to claim 4, wherein
login from the server to the gateway is prohibited, and
login from the gateway to the server is permitted.

6. The data transmission/reception system according to claim 4, wherein
the gateway executes the session continuity determination program via the CPU to be further configured for determining the particular time calculated by adding a particular margin to an average value of a predetermined number of past time intervals as variables T*S received from the server.

* * * * *